US012139016B2

(12) United States Patent
Yasui et al.

(10) Patent No.: US 12,139,016 B2
(45) Date of Patent: Nov. 12, 2024

(54) INFORMATION PROCESSING DEVICE, VEHICLE, COMPUTER-READABLE STORAGE MEDIUM, AND INFORMATION PROCESSING METHOD

(71) Applicant: HONDA MOTOR CO., LTD., Tokyo (JP)

(72) Inventors: Yuji Yasui, Saitama (JP); Nanami Tsukamoto, Saitama (JP); Misako Yoshimura, Saitama (JP); Kentaro Yamada, Saitama (JP); Hisashi Ishimatsu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 758 days.

(21) Appl. No.: 17/159,167

(22) Filed: Jan. 27, 2021

(65) Prior Publication Data

US 2021/0252981 A1 Aug. 19, 2021

(30) Foreign Application Priority Data

Feb. 17, 2020 (JP) .................................. 2020-024141

(51) Int. Cl.
 *B60K 37/02* (2006.01)
 *B60K 35/60* (2024.01)
 (Continued)

(52) U.S. Cl.
 CPC ............ *B60K 35/60* (2024.01); *B60R 16/037* (2013.01); *B60W 10/30* (2013.01); *G06T 13/80* (2013.01);
 (Continued)

(58) Field of Classification Search
 CPC .............. B60K 37/02; B60K 2370/152; B60K 2370/165; B60K 2370/583;
 (Continued)

(56) References Cited

U.S. PATENT DOCUMENTS

2009/0007346 A1 1/2009 Kyung
2011/0187727 A1 8/2011 Ahn
(Continued)

FOREIGN PATENT DOCUMENTS

CN 1794740 A 6/2006
CN 101775730 A 7/2010
(Continued)

OTHER PUBLICATIONS

Office Action issued for counterpart Chinese Application 202110176481.1, issued by The State Intellectual Property Office of People's Republic of China on Oct. 12, 2023.

*Primary Examiner* — Sahar Motazedi

(57) ABSTRACT

An information processing device includes a display control unit which controls a display unit which can display an image of a character and a graphical user interface (GUI) which accepts an operation instruction for an apparatus. The information processing device includes an obtaining unit which obtains information indicating an operation content of an apparatus intended by a user. The display control unit determines the presentation duration for which a presentation image of the character operating the GUI is displayed based on the operation content and causes a display unit to display the presentation image for the presentation duration.

12 Claims, 12 Drawing Sheets

(51) Int. Cl.
*B60R 16/037* (2006.01)
*B60W 10/30* (2006.01)
*G06T 13/80* (2011.01)
*B60K 35/22* (2024.01)
*B60K 35/28* (2024.01)
*B60K 35/85* (2024.01)

(52) U.S. Cl.
CPC .............. *B60K 35/22* (2024.01); *B60K 35/28* (2024.01); *B60K 35/85* (2024.01); *B60K 2360/165* (2024.01); *B60K 2360/583* (2024.01); *B60W 2510/30* (2013.01)

(58) Field of Classification Search
CPC .......... B60K 2370/11; B60K 2370/111; B60K 2370/1438; B60K 2370/193; B60K 35/00; B60R 16/037; B60R 11/0229; B60W 10/30; B60W 2510/30; G06T 13/80; G06T 13/00; G06F 3/04847; G06F 3/0488
See application file for complete search history.

(56) References Cited

U.S. PATENT DOCUMENTS

| | | | |
|---|---|---|---|
| 2017/0132019 | A1 | 5/2017 | Karashchuk |
| 2018/0190001 | A1* | 7/2018 | Napier .................... G06T 13/80 |
| 2019/0255909 | A1* | 8/2019 | Takenaka .............. G06F 3/0362 |
| 2020/0159366 | A1* | 5/2020 | Matsuda ................ G06F 3/0488 |
| 2022/0161813 | A1* | 5/2022 | Oba ................. G08G 1/096775 |

FOREIGN PATENT DOCUMENTS

| | | |
|---|---|---|
| CN | 102147701 A | 8/2011 |
| CN | 108352006 A | 7/2018 |
| JP | 2010076602 A | 4/2010 |
| JP | 2019105944 A | 6/2019 |

* cited by examiner

| OPERATION CONTENT | | PRESENTATION DURATION | |
| --- | --- | --- | --- |
| OPERATION TYPE | OPERATION AMOUNT | ARRIVAL DURATION | OPERATION DURATION |
| AIR CONDITIONER ON | – | 5 | 0 |
| AIR CONDITIONER OFF | – | 4 | 0 |
| AIR FLOW RATE ADJUSTMENT | LARGE AIR FLOW RATE ADJUSTMENT | 1 | 3 |
| | MIDDLE AIR FLOW RATE ADJUSTMENT | 1 | 2 |
| | SMALL AIR FLOW RATE ADJUSTMENT | 1 | 1 |
| SEAT BACK ANGLE ADJUSTMENT | LARGE ANGLE ADJUSTMENT | 1 | 3 |
| | MIDDLE ANGLE ADJUSTMENT | 1 | 2 |
| | SMALL ANGLE ADJUSTMENT | 1 | 1 |
| SWITCHING OF A CD TO BE PLAYED | – | 4 | 0 |
| ⋮ | ⋮ | ⋮ | ⋮ |

FIG. 7

| ADDITIONAL PERFORMANCE TYPE | ADDED TIME |
|---|---|
| FALLING DOWN | 1 PER ONE PERFORMANCE |
| GETTING LOST | 1.5 PER ONE PERFORMANCE |
| FAILING IN OPERATION | 1 PER ONE PERFORMANCE |
| CONTEMPLATING | 1 PER ONE PERFORMANCE |
| ⋮ | ⋮ |

*FIG. 8*

| ARRIVAL DURATION (T1) | AVERAGE MOVING SPEED | ADDITIONAL PERFORMANCE TYPE | | | |
|---|---|---|---|---|---|
| | | FALLING DOWN | GETTING LOST | FAILING IN OPERATION | CONTEMPLATING |
| 0 ≦ T1 < 2 | 0.3 | 0 | 0 | 0 | 0 |
| 2 ≦ T1 < 4 | 0.2 | 1 | 0 | 0 | 0 |
| 4 ≦ T1 < 6 | 0.1 | 1 | 1 | 0 | 0 |
| 6 ≦ T1 < 8 | 0.1 | 1 | 1 | 1 | 0 |
| ... | ... | ... | ... | ... | ... |

FIG. 9

| OPERATION DURATION (T2) | ADDITIONAL PERFORMANCE TYPE | |
|---|---|---|
| | FAILING IN OPERATION | CONTEMPLATING |
| $0 \leq T2 < 3$ | 0 | 0 |
| $3 \leq T2 < 5$ | 1 | 0 |
| $5 \leq T1 < 7$ | 1 | 1 |
| ⋮ | ⋮ | ⋮ |

FIG. 10

INFORMATION PROCESSING DEVICE, VEHICLE, COMPUTER-READABLE STORAGE MEDIUM, AND INFORMATION PROCESSING METHOD

CROSS REFERENCE TO RELATED APPLICATION

The contents of the following Japanese patent application are incorporated herein by reference, Japanese Patent Application NO. 2020-024141 filed on Feb. 17, 2020.

BACKGROUND

1. Technical Field

The present invention relates to an information processing device, a vehicle, a computer-readable storage medium, and an information processing method.

2. Related Art

Patent document 1 describes that "in an in-vehicle apparatus control device, . . . a character who indicates the message may be displayed as an animation on the head-up display or the instrument panel". Prior art document Patent Document

[Patent document 1] Japanese Unexamined Patent Application Publication No. 2010-076602

BRIEF DESCRIPTION OF THE DRAWINGS

FIG. 7 shows the data structure of presentation duration information.

FIG. 8 shows the data structure of additional presentation information.

FIG. 9 shows the data structure of moving presentation information.

FIG. 10 shows the data structure of operation presentation information.

DESCRIPTION OF EXEMPLARY EMBODIMENTS

Hereinafter, the present invention will be described through the embodiments of the invention. However, the embodiments described below are not to limit the claimed invention. Also, all combinations of features described in the embodiments are not necessarily essential to solutions of the invention.

Figure 1:
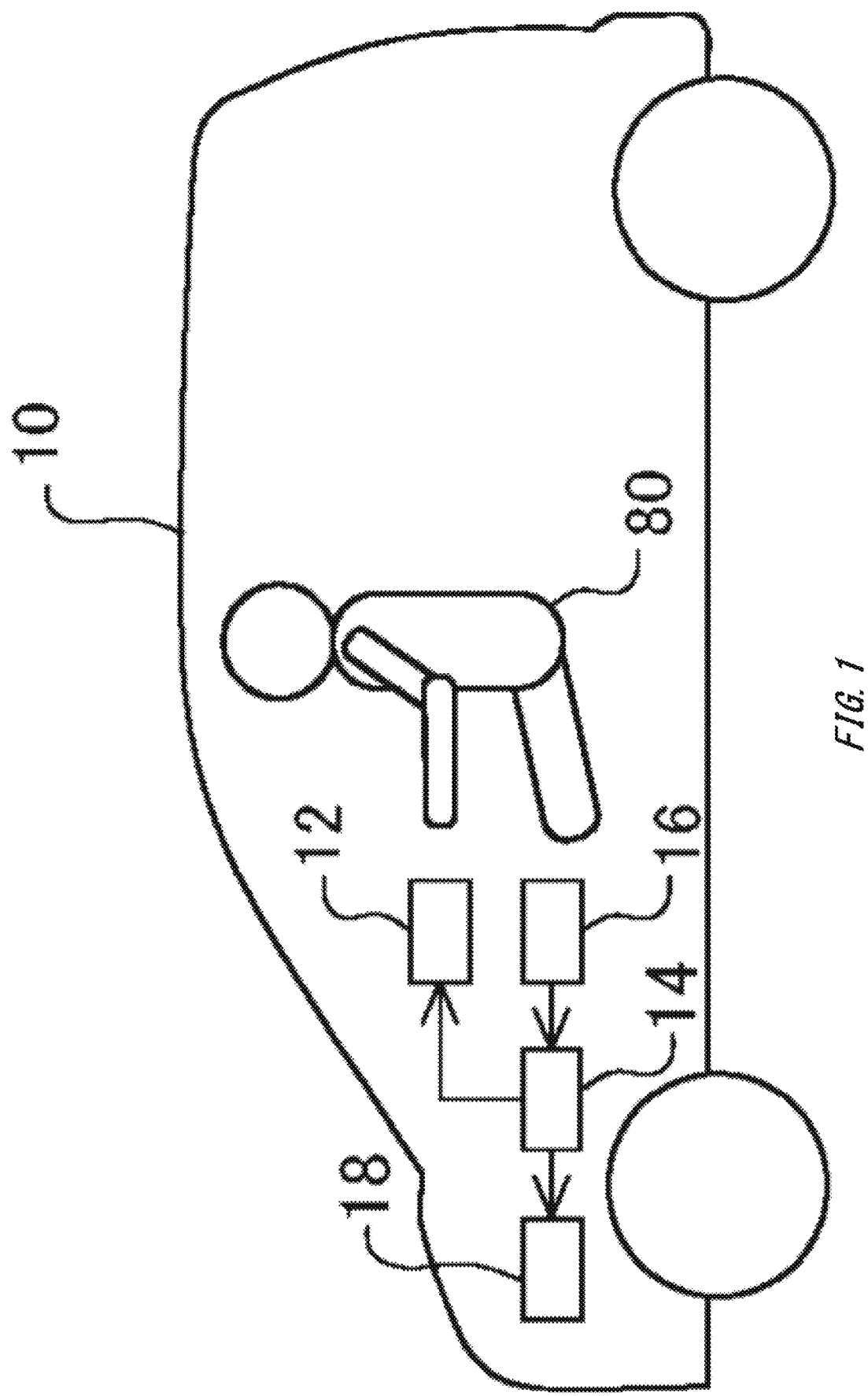
FIG. 1 schematically shows a configuration included in a vehicle 10.
Figure 2:
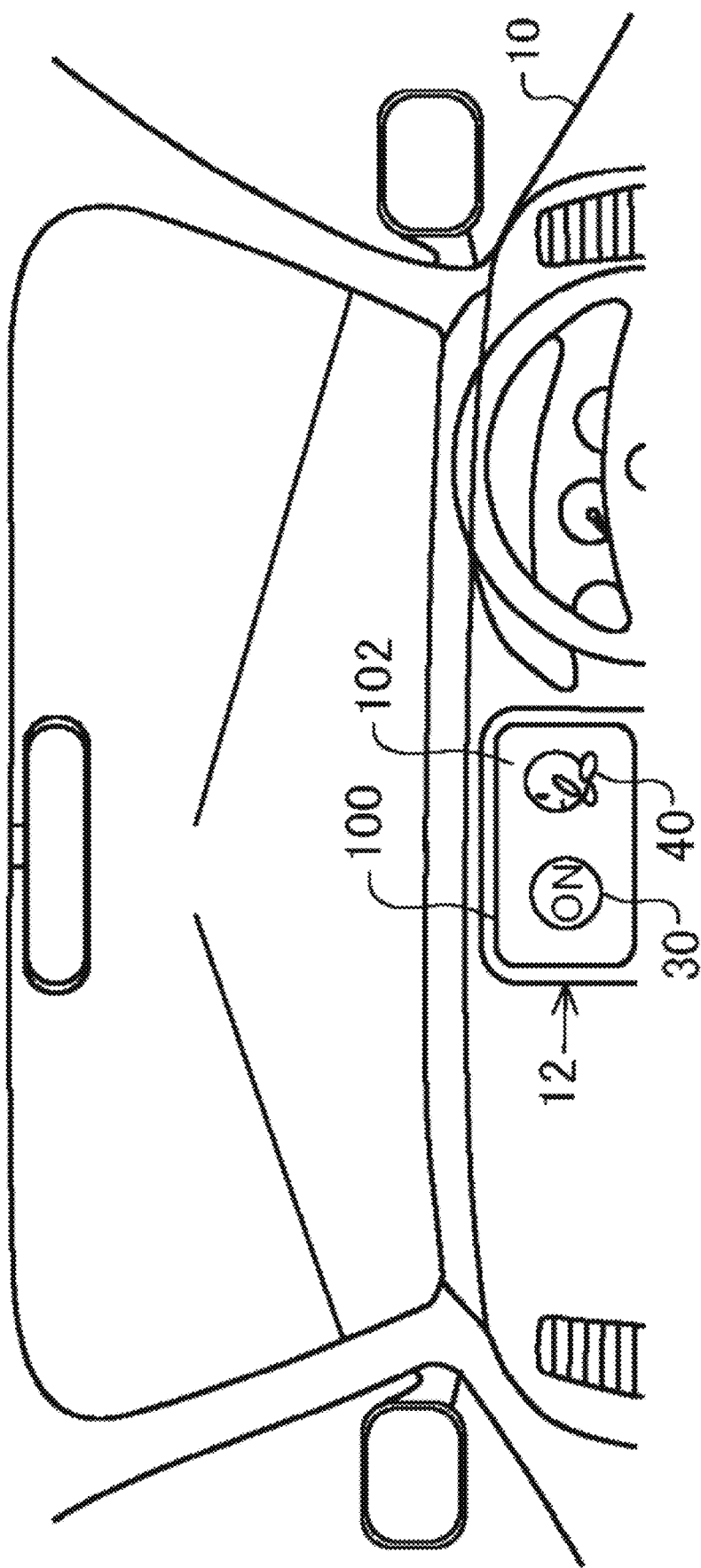
FIG. 2 schematically shows a view within the vehicle 10.

FIG. 1 schematically shows a configuration included in the vehicle 10. The vehicle 10 is, for example, a transport apparatus such as a motor vehicle. FIG. 2 schematically shows a view within the vehicle 10.

The vehicle 10 includes a navigation device 12, an information processing device 14, a sensor 16, and an auxiliary machine 18. The navigation device 12 includes a navigation function for navigating the vehicle 10. In addition, the navigation device 12 includes a function for displaying a GUI screen which accepts an instruction for the auxiliary machine 18 from an occupant 80. The auxiliary machine 18 is an air conditioner, a music player such as a CD (compact disk) changer, a driving device of a seating seat for the occupant 80, or the like.

The sensor 16 obtains the information of the occupant 80. For example, the sensor 16 includes a microphone which obtains a voice of the occupant 80, a camera which obtains image information of the occupant 80, or the like. The information processing device 14 identifies the operation content of the auxiliary machine 18 intended by the occupant 80 based on the voice information or image information of the occupant 80 obtained by the sensor 16 to control the auxiliary machine 18.

For example, when the information processing device 14 obtains voice information which indicates that the occupant 80 said "it's hot", it determines that the occupant 80 intend to activate a cooling function of an air conditioner. In this case, the information processing device 14 activates the cooling function of the air conditioner. At this time, the information processing device 14 activates the cooling function of the air conditioner and also controls the display of the GUI screen which is displayed on the navigation device 12.

In one example, the GUI screen 102 shown in FIG. 2 is a GUI screen for accepting an instruction for activating the cooling function of the air conditioner. The GUI screen 102 includes a GUI element 30. The GUI element 30 is a GUI element for accepting via a touch input an instruction from the occupant 80 for starting the activation of the cooling function of the air conditioner. When the information processing device 14 detects that the GUI element 30 is touched by the occupant 80, it activates the cooling function of the air conditioner.

When the information processing device 14 obtains the voice information indicating that the occupant 80 said "it's hot" through, for example, the sensor 16, it activates the cooling function of the air conditioner without the GUI element 30 being touched. At this time, the information processing device 14 activates the cooling function of the air conditioner and also causes a display unit 100 of the navigation device 12 to display the presentation image of a character 40 operating the GUI element 30. For example, the information processing device 14 displays on the GUI screen 102 an animation in which the character 40 moves by walking to the display position of the GUI element 30 and then touches the GUI element 30.

The auxiliary machine 18 such as the air conditioner or the CD changer possibly causes a response delay of an action. Therefore, if the occupant 80 instructs to activate the auxiliary machine 18 by, for example, touching the GUI element 30, he or she possibly feels that the action of the auxiliary machine 18 delays. However, according to the information processing device 14, if the intended operation of the auxiliary machine 18 is obtained through the voice from the occupant 80 or the like, the auxiliary machine 18 is activated promptly and the character 40 takes a time to move to the GUI element 30 according to the response delay of the auxiliary machine 18. This can cause the occupant 80 to feel less response delay of the auxiliary machine 18.

Figure 3:
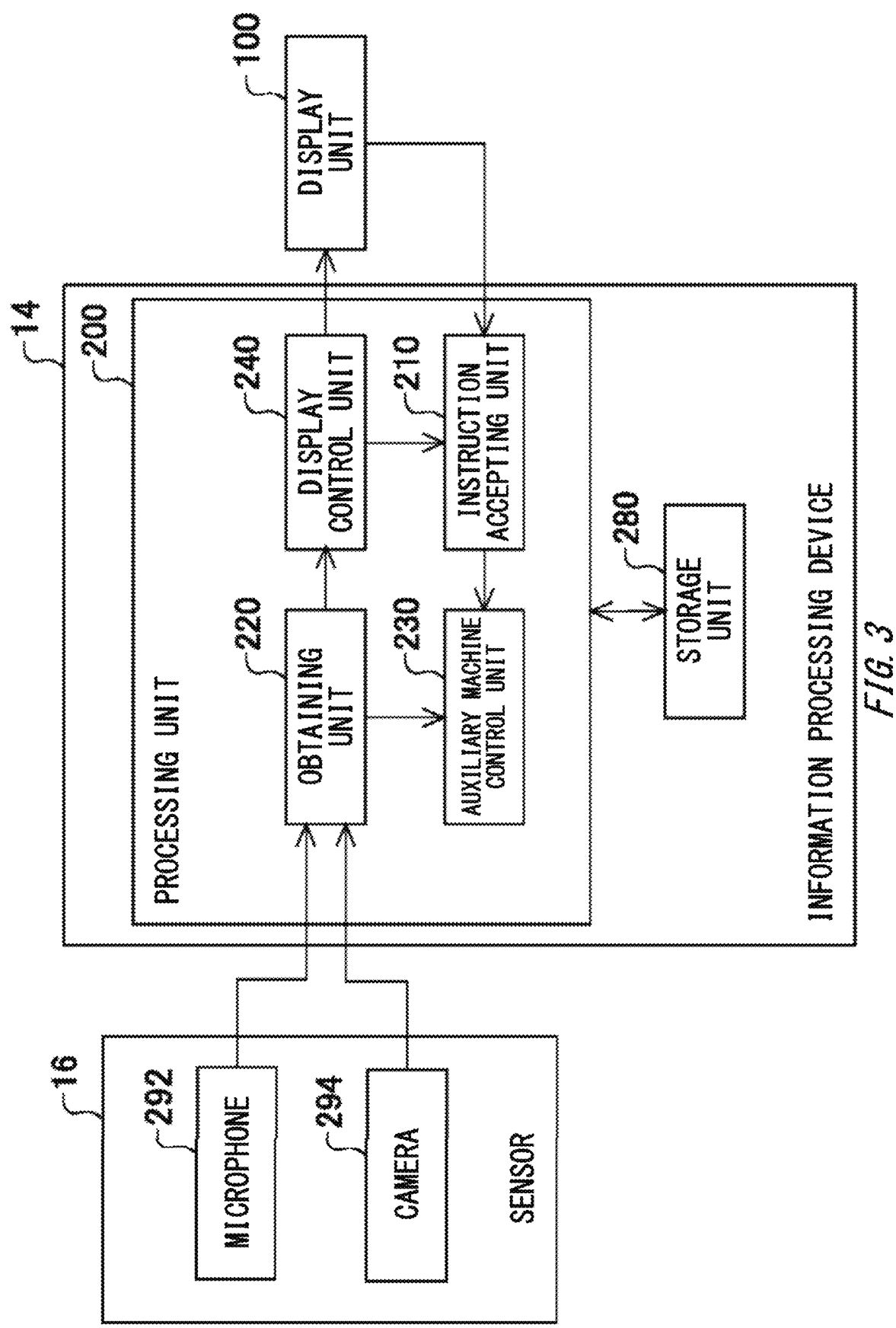
FIG. 3 shows a system configuration of a control system including an information processing device 14, a sensor 16, and a display unit 100.

FIG. 3 shows a configuration of a system including the information processing device 14, the sensor 16, and the display unit 100. The sensor 16 includes a microphone 292 and a camera 294. The microphone 292 generates voice information based on the voice from the occupant 80. The camera 294 takes an image of the occupant 80 within the vehicle 10 and generates the image information of the occupant 80. The occupant 80 is a person who rides the vehicle 10. For example, the occupant 80 may be a driver of the vehicle 10. The occupant 80 may be a person other than the driver of the vehicle 10.

The display unit 100 is a display device of the navigation device 12. The display unit 100 can display the image of the character 40 and the graphical user interface (GUI) which accepts the operation instruction for the auxiliary machine 18. The GUI includes a GUI element for obtaining the touch input from a user. Note that the auxiliary machine 18 is one example of the "apparatus".

The information processing device 14 includes a processing unit 200 and a storage unit 280. The processing unit 200 is achieved by, for example, a computing processing device including a processor. The storage unit 280 is achieved by including a non-volatile storage medium. The processing unit 200 performs a process by using the information stored in the storage unit 280.

The processing unit 200 includes an instruction accepting unit 210, an obtaining unit 220, a display control unit 240, and an auxiliary machine control unit 230. The display control unit 240 controls the display unit 100.

The obtaining unit 220 obtains the information indicating the operation content of the auxiliary machine 18 intended by the occupant 80. The obtaining unit 220 obtains the information indicating the operation content of the auxiliary machine 18 intended by the occupant 80 based on, for example, at least one of the voice information or image information of the occupant 80. For example, the obtaining unit 220 obtains the text information indicating the speaking content of the occupant 80 as the information indicating the operation content. For example, the obtaining unit 220 transmits, to the voice recognition server outside the vehicle 10, the voice information generated by the microphone 292 and obtains the text information extracted in the voice recognition server. In addition, the obtaining unit 220 obtains the gesture information indicating the gesture by the occupant 80 as the information indicating the operation content. For example, the obtaining unit 220 analyzes the image information generated by the camera 294 and obtains the gesture information. The obtaining unit 220 identifies the information indicating the operation content of the auxiliary machine 18 intended by the occupant 80 based on the obtained text information or gesture information. The auxiliary machine control unit 230 controls the auxiliary machine 18 based on the operation content obtained by the obtaining unit 220.

The "operation content of the auxiliary machine 18" is, for example, "activating the cooling function of the air conditioner", "switching the CD in the CD changer", "increasing the angle of the seat back by a specified amount", or the like. For example, the obtaining unit 220 obtains the "activating the cooling function of the air conditioner" as the operation content of the auxiliary machine 18 based on the text information of "it's hot". In addition, the obtaining unit 220 obtains "switching the CD in the CD changer" as the operation content of the auxiliary machine 18 from the text information of "change to the next CD". In addition, the obtaining unit 220 obtains "increasing the angle of the seat back by a specified amount" as the operation content of the auxiliary machine 18 from the text information of "put the seat back a little".

The display control unit 240 determines, based on the operation content, the presentation duration for displaying the presentation image of the character 40 operating the GUI. The display control unit 240 causes the presentation image to be displayed on the display unit 100 for the presentation duration. For example, the display control unit 240 determines the presentation duration based on the necessary duration required for the auxiliary machine 18 to complete the action of the operation content. Specifically, if the operation content obtained by the obtaining unit 220 is "activating the cooling function of the air conditioner", the display control unit 240 determines the presentation content based on the duration required until the activation of the cooling function of the air conditioner starts.

The display control unit 240 may increase the presentation duration as the necessary duration increases. If the presentation duration exceeds a predetermined duration, the display control unit 240 may display on the display unit 100 the image of the character 40 falling down as the presentation image. If the presentation duration exceeds a predetermined duration, the display control unit 240 may display on the display unit 100 the image of the character 40 failing in the operation of the GUI as the presentation image.

The display control unit 240 may display on the display unit 100 the moving image of the character 40 moving toward the location of the GUI as the presentation image. The display control unit 240 may determine the arrival duration for the character 40 to arrive at the location of the GUI as a result of the moving, based on the presentation duration. For example, the display control unit 240 may increase the arrival duration as the presentation duration increases. If the presentation duration exceeds a predetermined duration, the display control unit 240 may increase the arrival duration by changing the path through which the character 40 moves toward the GUI.

The display control unit 240 may determine, based on the operation content, the arrival duration for the character 40 to arrive at the location of the GUI and the operation duration for the character 40 to operate the GUI. For example, the display control unit 240 may display on the display unit 100 a first presentation image of the character 40 moving toward the location of the GUI for the moving duration associated with the operation content. In addition, the display control unit 240 may display on the display unit 100 a second presentation image of the character 40 operating the GUI for the operation duration associated with the operation content.

The instruction accepting unit 210 obtains the touch operation information for the display side of the display unit 100 from the display unit 100. The instruction accepting unit 210 identifies the operation for the GUI based on the touch operation information. The instruction accepting unit 210 identifies the instruction from the occupant 80 based on the operation for the GUI. If the GUI displayed on the display unit 100 is operated without a presentation image displayed, the instruction accepting unit 210 accepts the instruction from the occupant 80. If the GUI is operated with a presentation image displayed, the instruction accepting unit 210 accepts no instruction from the occupant 80. For example, while the display control unit 240 causes the presentation image to be displayed on the display unit 100, it may control the instruction accepting unit 210 such that the obtained touch operation information is not accepted as an instruction from the occupant 80.

Figure 4:
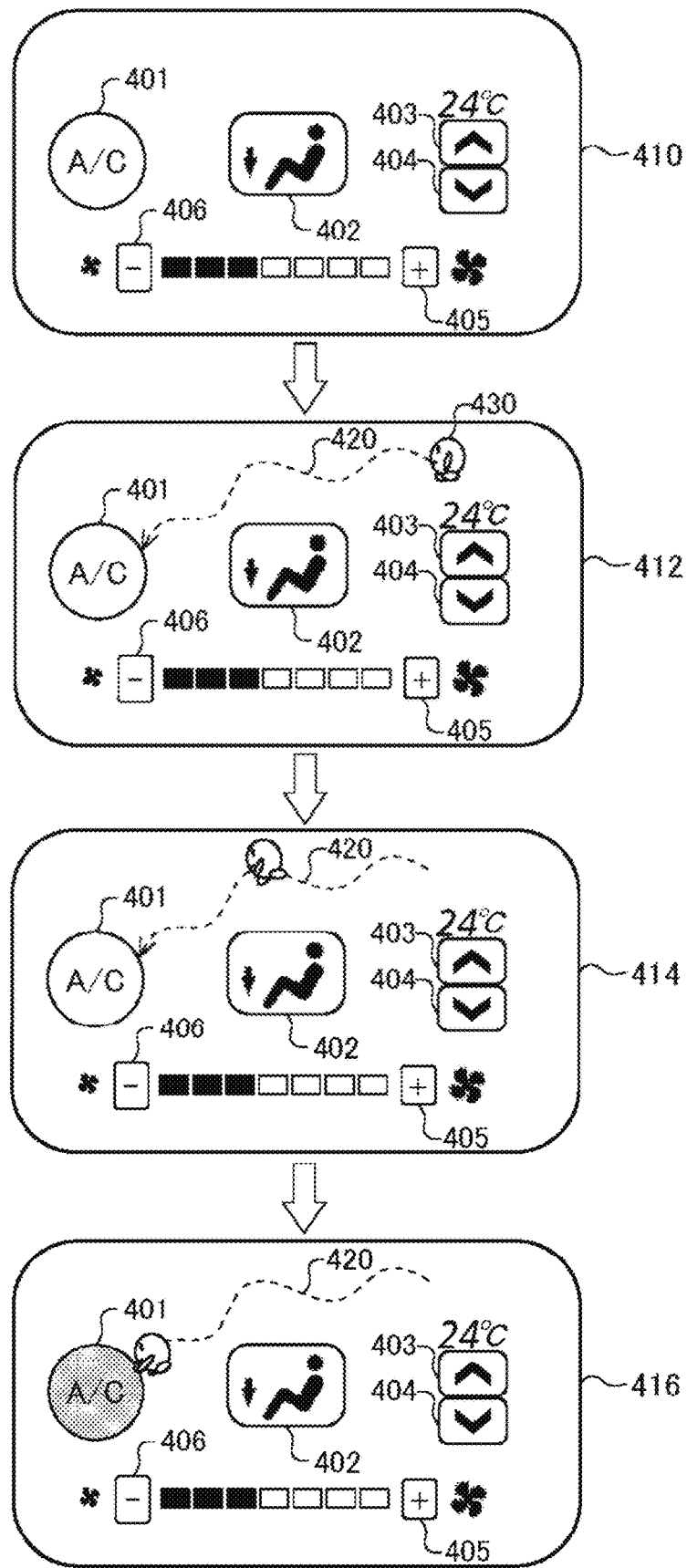
FIG. 4 shows one example of a GUI screen for performing an operation of an air conditioner.

FIG. 4 shows one example of a GUI screen for operating an air conditioner. The GUI screen 410 includes an ON/OFF button 401, a balloon setting button 402, a set temperature up button 403, a set temperature down button 404, an air flow rate up button 405, and an air flow rate down button 406. Each of the ON/OFF button 401, the balloon setting button 402, the set temperature up button 403, the set temperature down button 404, the air flow rate up button 405, and the air flow rate down button 406 is a GUI element which supports a touch operation by the occupant 80.

When the occupant 80 touches the ON/OFF button 401 without the air conditioner activated, the instruction accepting unit 210 causes the auxiliary machine control unit 230 to activate the air conditioner. When the occupant 80 touches the balloon setting button 402, the instruction accepting unit 210 causes the auxiliary machine control unit 230 to perform the opening and closing action of an air outlet. When the occupant 80 touches the set temperature up button 403, the instruction accepting unit 210 causes the auxiliary machine control unit 230 to increase the set temperature. When the occupant 80 touches the set temperature down button 404, the instruction accepting unit 210 causes the auxiliary machine control unit 230 to decrease the set temperature. When the occupant 80 touches the air flow rate up button 405, the instruction accepting unit 210 causes the auxiliary machine control unit 230 to increase the blow rate. When the occupant 80 touches the air flow rate down button 406, the instruction accepting unit 210 causes the auxiliary machine control unit 230 to decrease the blow rate.

Here, it is assumed that the air conditioner is not activated when the GUI screen 410 is displayed. When the occupant 80 says "it's hot" in this state, the obtaining unit 220 causes the auxiliary machine control unit 230 to activate the cooling function of the air conditioner based on the text information of "it's hot". For example, the auxiliary machine control unit 230 performs a preparation action such as initiating a compressor for the air conditioner or opening and closing a valve.

When the occupant 80 says "it's hot", the display control unit 240 transits from the GUI screen 410 to the GUI screen 412 in which the character 430 is displayed. The display control unit 240 determines the path 420 through which the character 430 moves to the display position of the ON/OFF button 401 and the moving speed of the character 430 based on the duration required for the preparation action of the air conditioner. The display control unit 240 may determine the location at which the character 430 starts to move, based on the duration required until the cooling function of the air conditioner is activated.

Then, the display control unit 240 causes the display unit 100 to display the moving image of the character 430 moving through the path 420 toward the ON/OFF button 401, which is shown in the GUI screen 414. Note that in a case where the duration required until the cooling function of the air conditioner is activated is longer than a predetermined duration, the display control unit 240 may cause the character 430 to perform an action such as falling down or getting lost while the character 430 moves through the path 420. In addition, in a case where the duration required until the cooling function of the air conditioner is activated is longer than a predetermined duration, the display control unit 240 may cause, after the character 430 moving through the path 420, an action of the character 430 failing in the operation of the ON/OFF button 401, the character 430 contemplating before operating the ON/OFF button 401, or the like.

Then, the operation image of the character 430 operating the ON/OFF button 401, which is shown in the GUI screen 416, is displayed on the display unit 100. Thereby, the preparation action such as initiating the compressor for the air conditioner or opening and closing a valve or the like is completed while the character 430 is moving, and the activation of the air conditioner can be started at the timing when the character 430 operates the ON/OFF button 401. This can cause the occupant 80 to feel less response delay of the cooling function of the air conditioner.

Similarly, for the operation associated with the balloon setting button 402, the set temperature up button 403, the set temperature down button 404, the air flow rate up button 405, and the air flow rate down button 406, the display control unit 240 causes the moving image, in which the character 430 moves toward the display position of corresponding each button, or the operation image, in which the character 430 operates each button, to be displayed based on the operation content identified from the voice information of the occupant 80. This can cause the occupant 80 to feel less response delay of the air conditioner.

Figure 5:
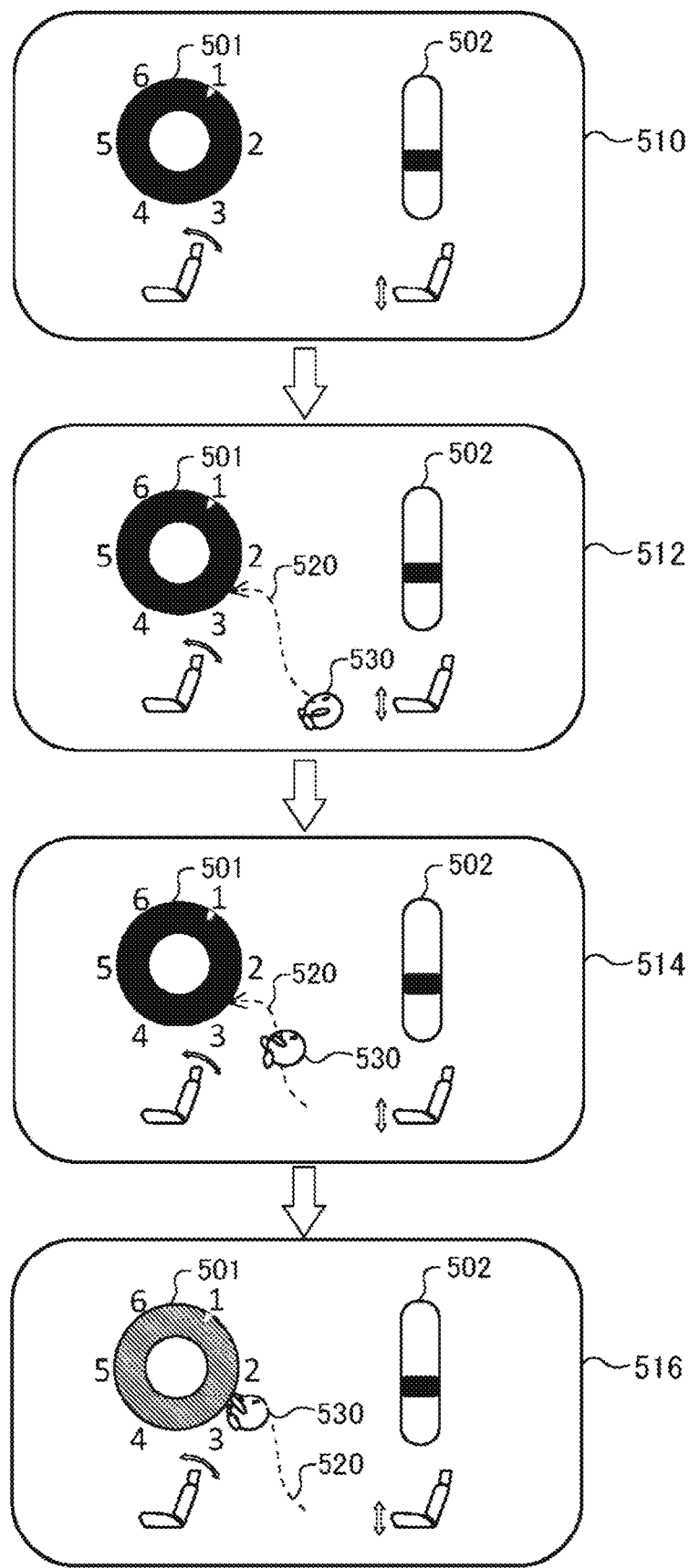
FIG. 5 shows one example of a GUI screen for performing seat adjustment.

FIG. 5 shows one example of the GUI screen for performing seat adjustment. The GUI screen 510 includes a dial 501 for angular adjustment of the seat back and a slide button 502 for seat height adjustment. Each of the dial 501 and the slide button 502 is a GUI element which supports a touch operation by the occupant 80.

When the occupant 80 turns the dial 501, the instruction accepting unit 210 causes the auxiliary machine control unit 230 to drive the actuation mechanism such as a motor for the angular adjustment of the seat back depending on the turned amount of the dial 501 to change the angle of the seat back. When the occupant 80 performs a slide operation of the slide button 502, the instruction accepting unit 210 causes the auxiliary machine control unit 230 to drive the actuation mechanism such as a motor for seat height adjustment depending on the slide amount of the slide button 502 to change the height of the seat.

For example, when the occupant 80 says "put the seat back a little" with the GUI screen 510 displayed, the obtaining unit 220 causes the auxiliary machine control unit 230 to start the preparation action of the actuation mechanism for the angular adjustment of the seat back based on the text information of "put the seat back a little". Examples of the preparation action can include activating the power unit of the angular adjustment motor or making the gear mechanism, lock mechanism, or the like ready for performing the angular adjustment of the seat back, or the like.

In parallel with the preparation action of the actuation mechanism for the angular adjustment of the seat back, the display control unit 240 transits from the GUI screen 510 to the GUI screen 512 in which the character 530 is displayed. The display control unit 240 determines the path 520 through which the character 530 moves to the dial 501 and the moving speed based on the duration required for the preparation action of the actuation mechanism. The display control unit 240 may determine the location where the character 530 starts moving, based on the duration required for the preparation action of the actuation mechanism.

Then, the display control unit 240 causes the moving image of the character 530 moving through the path 520 toward the display position of the dial 501, which is shown in the GUI screen 514, is displayed on the display unit 100. Note that, when the duration required for the preparation action of the actuation mechanism is longer than a predetermined duration, the display control unit 240 may cause an action of the character 530 such as falling down or getting lost while the character 530 moves through the path 520.

Then, the operation image of the character 530 turning the dial 501, which is shown in the GUI screen 516, is displayed on the display unit 100. The duration for displaying the operation image of the character 530 turning the dial 501 is the duration required for changing the angle of the seat back by a specified value. Note that, when the duration required for changing the angle of the seat back is longer than a predetermined duration, the display control unit 240 may cause an action of the character 530 failing while operating the dial 501 or the character 430 contemplating while operating the dial 501.

This allows the preparation action of the actuation mechanism to be completed while the character 530 moves toward the display position of the dial 501, and the angular adjustment of the seat back to be performed while the character 530 operates the dial 501. Thereby, the angular adjustment of the seat back can be performed without the occupant 80 feeling the response delay.

Similarly, for the slide button 502, when the occupant 80 says "raise the seat a little", the display control unit 240 causes the auxiliary machine control unit 230 to start a preparation action of the actuation mechanism to increase the height of the seat, determine the path through which the character 530 moves to the slide button 502 based on the duration required for the preparation action of the actuation mechanism, and causes display unit 100 to display the moving image of the character 530 moving toward the display position of the dial 501. Then, the display control unit 240 causes the display unit 100 to display the operation image of the character 530 raising and lowering the slide button 502 for a duration required for the actuation mechanism to change the height of the seat by a specified value. Thereby, the preparation action of the actuation mechanism proceeds while the character 530 is moving, and the angular adjustment of the seat can be performed at the timing when the character 530 starts to operate the slide button 502. Thereby, the height adjustment of the seat back can be performed without the occupant 80 feeling the response delay.

Figure 6:
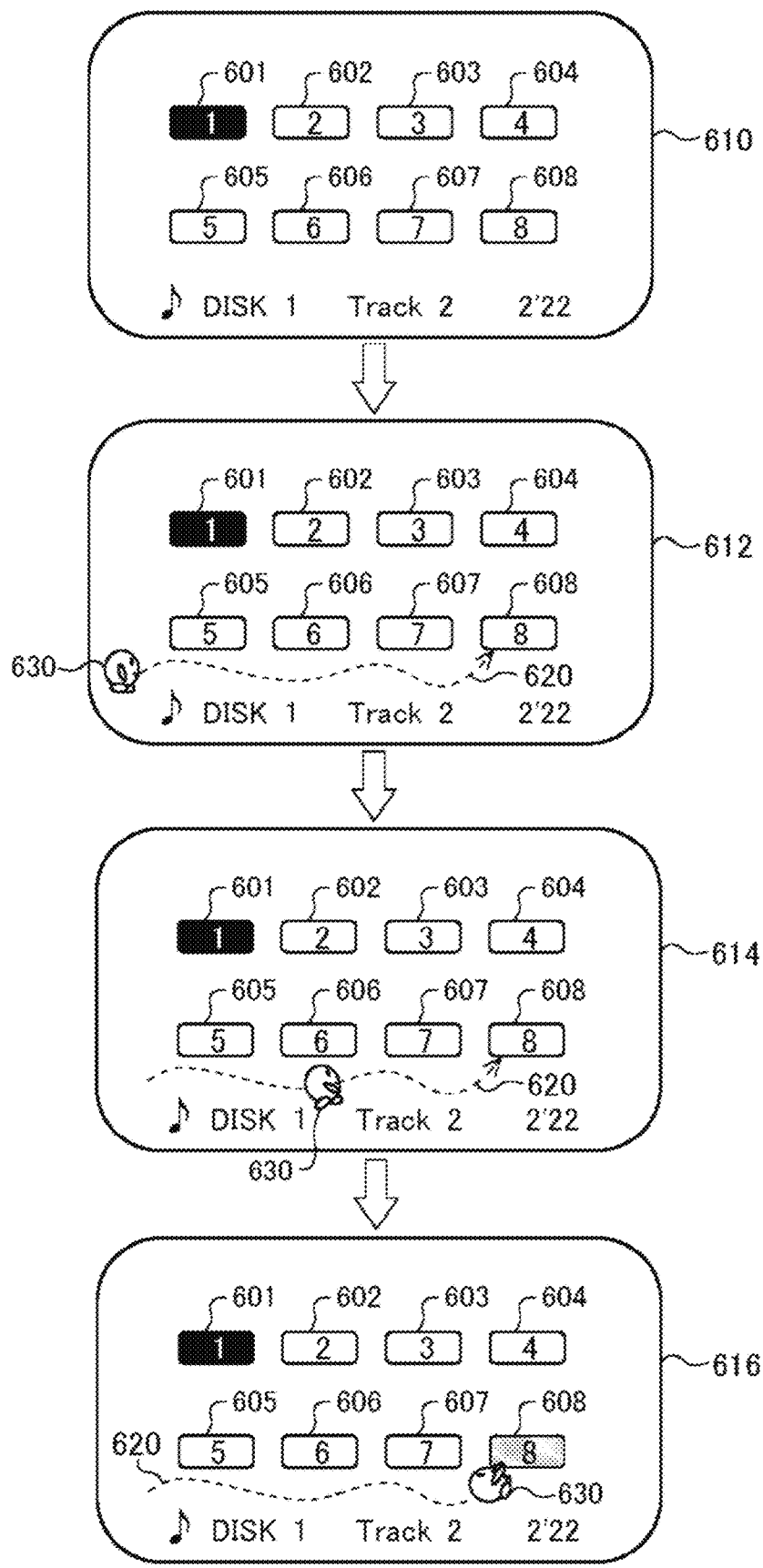
FIG. 6 shows one example of a GUI screen for switching a CD.

FIG. 6 shows one example of a GUI screen for switching a CD. The GUI screen 610 includes eight buttons for switching a CD to be played, that is, a button 601, a button 602, a button 603, a button 604, a button 605, a button 606, a button 607, and a button 608. Each of the button 601, the button 602, the button 603, the button 604, the button 605, the button 606, the button 607, and the button 608 is a GUI element which supports a touch operation by each occupant 80.

The button 601, the button 602, the button 603, the button 604, the button 605, the button 606, the button 607, and the button 608 are GUI elements for accepting the instruction to play the CD accommodated in the corresponding CD tray among eight CD trays of the magazine unit included in the CD changer device. For example, when the occupant 80 touches the location of the button 601, the instruction accepting unit 210 causes the auxiliary machine control unit 230 to play the CD accommodated in the CD tray corresponding to the button 601. The auxiliary machine control unit 230 instructs the CD changer to accommodate the CD which is currently being played in the CD tray of the magazine unit and load and play the CD accommodated in the instructed CD tray.

For example, when the occupant 80 says "play the eighth CD" with the GUI screen 610 displayed, the obtaining unit 220 causes the auxiliary machine control unit 230 to start the preparation action of the CD actuation mechanism of the CD changer based on the text information of "play the eighth CD". Examples of the preparation action of the CD actuation mechanism can include the action such as accommodating the CD which is currently being played in the CD tray of the magazine unit, loading the eighth CD to be played from the CD tray of the magazine unit, and turning the CD with a specified turning speed.

In parallel with the preparation action of the actuation mechanism for the CD changer, the display control unit 240 transits from the GUI screen 610 to the GUI screen 612 in which the character 630 is displayed. The display control unit 240 determines the path 620 through which the character 630 moves to the button 608 corresponding to the eighth CD and the moving speed of the character 630 based on the duration required for the preparation action of the CD actuation mechanism. The display control unit 240 may determine the location where the character 630 starts moving based on the duration required for the preparation action of the CD actuation mechanism.

Then, the display control unit 240 causes the display unit 100 to display the moving image of the character 630 moving through the path 620 toward the display position of the button 608, which is shown in the GUI screen 614. The moving duration for the character 630 to move to the display position of the button 608 may be the duration of the preparation action of the CD actuation mechanism. Note that, if the duration required for the preparation action of the CD actuation mechanism is longer than a predetermined duration, the display control unit 240 may cause the character 630 to perform the action such as falling down or getting lost while the character 630 moves through the path 620. In addition, if the duration required for the preparation action of the CD actuation mechanism is longer than a predetermined duration, the display control unit 240 may cause, after the character 630 moving to through the path 620, the action of the character 630 failing in the operation of the button 601 or the character 630 contemplating before operating the button 601.

Then, the operation image of the character 630 pushing the button 608, which is shown in the GUI screen 616, is displayed on the display unit 100. Thereby, the preparation action of the CD actuation mechanism can proceed while the character 630 is moving. Thereby, the CD to be played can be switched without the occupant 80 feeling the response delay.

FIG. 7 shows a data structure of the presentation duration information. The presentation duration information associates the operation content with the presentation duration.

The "operation content" is identified by using the combination of the operation type and the operation amount. The "operation type" is "air conditioning ON", "air conditioning OFF", "air flow rate adjustment", "seat back angle adjustment", "switching of CD to be played", or the like. The "air conditioning ON" is an operation to activate the air conditioner. The "air conditioning OFF" is an operation to stop the air conditioner. The "air flow rate adjustment" is an operation to adjust the air flow rate of the air conditioner. The "seat back angle adjustment" is an operation to adjust the angle of the seat back. The "switch of CD to be played" is an operation for the CD changer device to change the CD to be played.

The "operation amount" is a measure representing the amount of operation in each operation. For example, the "operation amount" in the air flow rate adjustment may include "large air flow rate adjustment amount", "middle air flow rate adjustment amount", "small air flow rate adjustment amount", or the like. The "operation amount" in the adjustment of the inclination angle of the seat back may include, for example, "large angular adjustment amount", "middle angular adjustment amount", "small angular adjustment amount", or the like.

Note that the obtaining unit 220 identifies the operation type and the operation amount based on the text information obtained from the speaking of the occupant 80. For example, when the occupant 80 says "put the seat back a little", the "seat back angle adjustment" is identified as an operation type from the text information of "seat" and "put back", and the "small angular adjustment" is identified as the operation amount from the text information of "a little". In addition, when the occupant 80 says "lower the air flow rate a little", the "air flow rate adjustment" is identified as the operation type from the text information of "air flow rate" and "lower", and the "small air flow rate adjustment" is identified as the operation amount from the text information of "a little".

The "presentation duration" represents the entire duration for which the presentation of the character is performed. The "presentation duration" includes an arrival duration and an operation duration. The "arrival duration" is a duration for which the character moves toward the GUI element to be operated. The "operation duration" is a duration for which the character operates the GUI element to be operated. The display control unit 240 refers to the presentation duration information and identifies the arrival duration and the operation duration corresponding to the combination of the operation type and the operation amount to determine the presentation duration of the character.

FIG. 8 shows a data structure of additional presentation information. The additional presentation information includes an additional presentation type and an additional duration. The "additional presentation type" includes information indicating falling down, getting lost, failing in operation, contemplating, or the like. The "falling down" indicates a presentation of the character falling down while moving. The "getting lost" indicates a presentation of the character showing a sign of getting lost while moving. The "failing in operation" indicates a presentation of the character failing in the operation of the GUI element. The "contemplating" indicates the presentation of the character performing the action of contemplating during the operation of the GUI element.

The "additional duration" indicates a duration by which the presentation duration can be increased by additionally performing one presentation. For example, the presentation information shown in FIG. 8 means that the presentation duration can be increased by one second by performing one additional presentation of "falling down". Therefore, when the operation of "air conditioning ON" is performed, to achieve five seconds of the presentation duration of "air conditioning ON", the duration for which the presentation of the character moving to a GUI element is performed can be four seconds by performing one presentation of the character falling down.

FIG. 9 shows a data structure of the moving presentation information. The moving presentation information associates the arrival duration, the average moving speed, and the additional presentation type. The display control unit 240 refers to the moving presentation information to determine what presentation to additionally perform while the character is moving toward the GUI element.

The "arrival duration" is the duration for the character to arrive at the GUI element to be operated. The "average moving speed" indicates a moving distance for the character to move per unit hour. Note that this "moving distance" may be the standardized length. For example, the "moving distance" may be the length standardized with the length of the long side of the display area of the display unit 100. The "additional presentation type" indicates the presentation type to be additionally performed. For example, if the presentation with the arrival duration from zero second to two seconds is performed, the display control unit 240 sets the average moving speed of the character to 0.3 and determines not to perform an additional presentation. On the other hand, when the presentation with the arrival duration from four seconds to six seconds is performed, the display control unit 240 sets the average moving speed of the character to 0.1 and determines to perform the additional presentation of "falling down" and "getting lost" once for each and not to perform the additional presentation of the "failing in operation" and "contemplating".

FIG. 10 shows a data structure of the operation presentation information. The operation presentation information associates the operation duration with the additional presentation type. The display control unit 240 refers to the operation presentation information to determine what presentation to additionally perform while the character operates a GUI element.

The "operation duration" is a duration for the character to operate the GUI element to be operated. The "additional presentation type" indicates a presentation type to be additionally performed. For example, if the presentation with the operation duration from zero second to three seconds is performed, the display control unit 240 determines not to perform an additional presentation. On the other hand, if the presentation with the operation duration from five seconds to seven seconds is performed, the display control unit 240 determines to perform the additional presentation of "failing in operation" and "contemplating" once for each.

Figure 11:
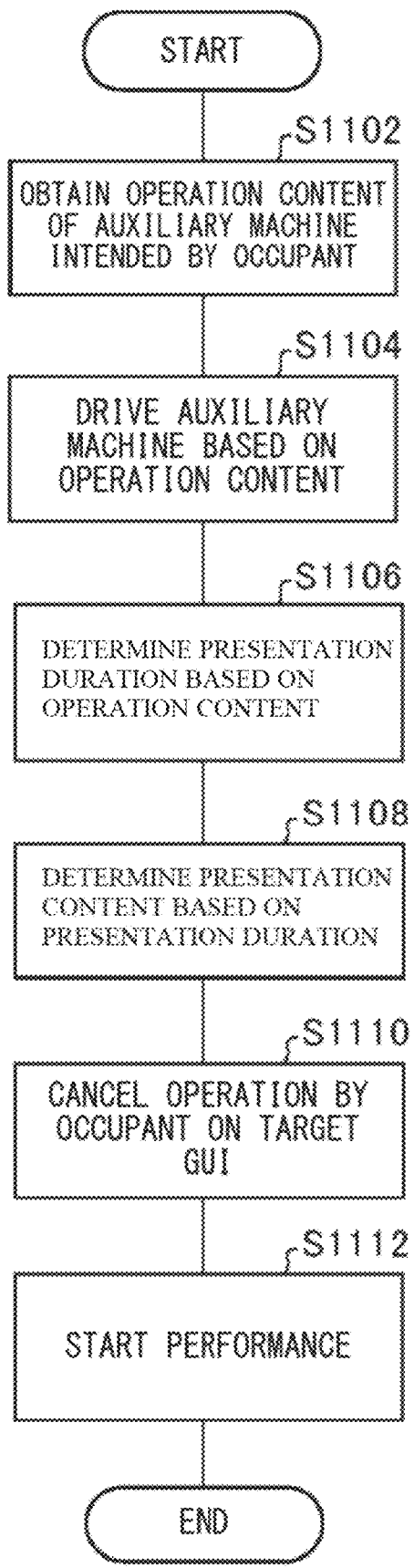
FIG. 11 shows the flowchart according to the information processing method performed by an information processing device 14.

FIG. 11 shows a flowchart according to an information processing method performed by the information processing device 14. At S1102, the obtaining unit 220 obtains the operation content intended by the occupant 80. For example, the obtaining unit 220 identifies the operation content for the auxiliary machine 18 intended by the occupant 80 based on the voice information and the image information of the occupant 80. At S1104, the auxiliary machine control unit 230 drives the auxiliary machine 18 based on the operation content obtained at S1102. Specifically, the auxiliary machine control unit 230 starts the preparation action required for activating the auxiliary machine 18 and starts the activation of the auxiliary machine 18 when the preparation action is completed.

At S1106, the display control unit 240 determines the presentation duration based on the operation content obtained at S1102. For example, the display control unit 240 refers to the presentation duration information described with reference to FIG. 7 to identify the arrival duration and the operation duration associated with the operation content obtained at S1102.

At S1108, the display control unit 240 determines the presentation content based on the presentation duration identified at S1106. For example, the display control unit 240 refers to the moving presentation information described with reference to FIG. 9 to identify the average moving speed and the type and the number of performance of the additional presentation associated with the arrival duration identified at S1106. In addition, it refers to the operation presentation information described with reference to FIG. 10 to identify the type and the number of performance of the additional presentation associated with the operation duration identified at S1106. Then, the display control unit 240 calculates the moving duration which achieves the arrival duration identified at S1106 based on the average moving speed and the additional presentation information described with reference to FIG. 8 to determine the path through which the character moves. In addition, the display control unit 240 determines what presentation to perform when the character operates the GUI element, based on the number of performance of the additional presentation described with reference to FIG. 10, the additional presentation information described with reference to FIG. 8, and the operation duration of the presentation duration information described with reference to FIG. 7. At S1110, the display control unit 240 disables the operation by the occupant 80 for the GUI element to be operated by the character. Specifically, even if the instruction accepting unit 210 obtains from the display unit 100 the operation information for the GUI element to be operated by the character, the display control unit 240 does not accept it as the instruction from the occupant 80. At S1112, the display control unit 240 performs the presentation according to the presentation content determined at S1108.

Note that, at S1110, the GUI element for which the operation is disabled by the display control unit 240 may be only the GUI element to be operated by the character. The GUI element for which the operation is disabled may further include the GUI element to be operated by the character. For example, in the GUI screen 612 and the GUI screen 614 shown in FIG. 6, not only the button 608 but also the button 601, the button 602, the button 603, the button 604, the button 605, the button 606, and the button 607 may be disabled. Note that the process at S1110 may not be performed.

As described above, the if the auxiliary machine 18 which causes a response delay is activated, the information processing device 14 displays a presentation image of the character taking a time to move to a GUI element and the character operates the GUI element. This can cause the occupant 80 to feel less response delay of the auxiliary machine 18.

Note that the display unit 100 is not limited to the display unit included in the navigation device 12. The display unit 100 may be a head-up display provided on the vehicle 10. The display unit 100 may be a display unit provided on an instrument panel. The display unit 100 may be a display of a mobile terminal. If the display unit 100 is a display of the mobile terminal, at least a part of the functions included in the information processing device 14 may be implemented in the mobile terminal.

The vehicle 10 is one example of a transport apparatus. The transport apparatus includes a train, a ship, an air plane, or the like, in addition to a motor vehicle such as a car or a bus. The transport apparatus is one example of a moving object.

The auxiliary machine 18 of the vehicle 10 is one example of the "apparatus" to be controlled by the information processing device. The "apparatus" may be an apparatus other than the auxiliary machine of the vehicle 10. For example, the "apparatus" may be a household appliance. If the "apparatus" is a household appliance, the "information processing device" may be provided corresponding to a dwelling unit. For example, the "information processing device" may be provided in a dwelling unit. The function of the "information processing device" may be achieved by a server outside the dwelling unit.

Figure 12:
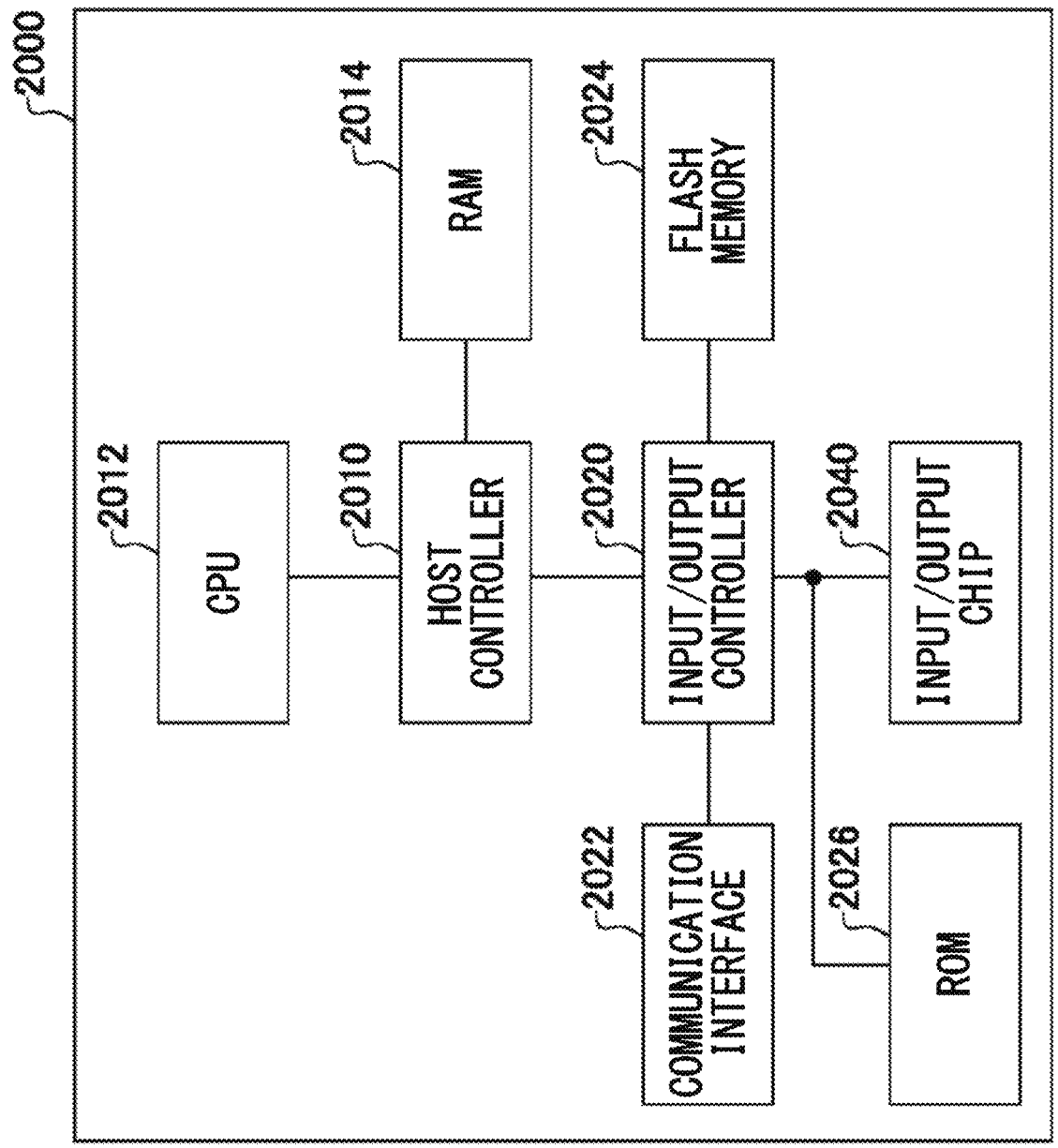
FIG. 12 shows an example of a computer 2000 in which a plurality of embodiments of the present invention is wholly or partially embodied.

FIG. 12 shows an example of the computer 2000 in which a plurality of embodiments of the present invention may be wholly or partially embodied. The program installed on the computer 2000 can cause the computer 2000 to serve as a device such as the information processing device 14 according to the embodiment or each unit of the device, perform an operation associated with the device or each unit of the device, and/or perform a process according to the embodiment or steps of the process. Such a program may be executed by a CPU 2012 in order to cause the computer 2000 to execute a specific operation associated with some or all of the blocks in the process procedure and the block diagram described in the specification.

The computer 2000 according to this embodiment includes the CPU 2012 and RAM 2014, which are connected mutually by a host controller 2010. The computer 2000 also includes a ROM 2026, a flash memory 2024, a communication interface 2022, and an input/output chip 2040. The ROM 2026, the flash memory 2024, the communication interface 2022 and the input/output chip 2040 are connected to the host controller 2010 via an input/output controller 2020.

The CPU 2012 operates according to the program stored in the ROM 2026 and the RAM 2014, thereby controlling each unit.

The communication interface 2022 communicates with other electronic devices via a network.

The flash memory 2024 stores the program and data used by the CPU 2012 in the computer 2000. The ROM 2026 stores a boot program or the like executed by the computer 2000 during activation, and/or a program depending on hardware of the computer 2000. The input/output chip 2040 may also connect, to the input/output controller 2020, a variety of input/output unit such as a keyboard, a mouse, and a monitor, via input/output ports such as a serial port, a parallel port, a keyboard port, a mouse port, a monitor port, a USB port, and HDMI (registered trademark) port.

The program is provided via a network or a computer-readable medium such as a CD-ROM, a DVD-ROM, or a memory card. The RAM 2014, the ROM 2026, or the flash memory 2024 is an example of the computer-readable medium. The program is installed in the flash memory 2024, the RAM 2014 or the ROM 2026 and executed by the CPU 2012. Information processing described in the program is read by the computer 2000, thereby resulting in cooperation between the program and above-described various types of hardware resources. A device or method may be constituted by implementing the operations or processing on information according to the use of the computer 2000.

For example, when communications are performed between the computer 2000 and external devices, the CPU 2012 may execute a communication program loaded in the RAM 2014, and instruct the communication interface 2022 to execute communication processing on based on the processes written in the communication program. The communication interface 2022, under the control of the CPU 2012, reads out transmission data stored in a transmission buffer processing area provided in a recording medium such as the RAM 2014 and the flash memory 2024, transmits the read transmission data to the network, and writes a reception data received from the network into a reception buffer processing area or the like provided on the recording medium.

Also, the CPU 2012 may cause all or required portions of a file or a database stored in the recording medium such as the flash memory 2024 to be read by the RAM 2014, and perform various kinds of processes on the data on the RAM 2014. The CPU 2012, then, writes back the processed data into the recording medium.

Various types of programs and various types of information such as data, tables, and databases may be stored in the recording medium, and they may be performed information processing on. The CPU 2012 may perform, on the data read from the RAM 2014, various kinds of processing including various kinds of operations, information processing, conditional judgments, conditional branching, unconditional branching, information searching/replacing and the like described in the specification and specified by an instruction sequence of the program, and writes back the result into the RAM 2014. Also, the CPU 2012 may search for information in a file, a database, etc., in the recording medium. For example, when a plurality of entries each having an attribute value of a first attribute respectively associated with an attribute value of a second attribute is stored in the recording medium, the CPU 2012 may search for, from among the plurality of entries, an entry in which the attribute value of the first attribute is specified and that match with a condition, read the attribute value of the second attribute stored in the entry, and thereby obtain the attribute value of the second attribute associated with the first attribute meeting a predetermined condition.

The program or software module described above may be stored on the computer 2000 or in a computer-readable medium near the computer 2000. The recording medium such as a hard disk or RAM provided in a server system connected to a dedicated communication network or the internet is available as a computer-readable medium. The program stored in the computer-readable medium may be provided to the computer 2000 via the network.

The program which is installed on the computer 2000 and causes the computer 2000 to serve as the information processing device 14 may instruct the CPU 2012 or the like to cause the computer 2000 to serve as each unit of the information processing device 14. The information processing described in these programs is read by the computer 2000 to serve as each unit of the information processing device 14 which is specific means in which software and the above-described various hardware cooperate. These specific means implement operations or processings of information according to the intended use of the computer 2000 in the present embodiment, and the information processing device 14 is thereby constructed to be specific for the intended use.

A variety of embodiments have been described with reference to the block diagram and the like. In the block diagram, each block may represent (1) a step of a process in which an operation is performed, or (2) each unit of the device having a role of performing the operation. Specific steps and each unit may be implemented by a dedicated circuit, a programmable circuit provided along with a computer-readable instruction stored on a computer-readable medium, and/or a processor provided along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including: logical AND, logical OR, exclusive OR (XOR), negative AND (NAND), negative OR (NOR), and other logical operation; and a memory element such as a flip-flop, a register, a field programmable gate array (FPGA), a programmable logic array (PLA); and so on.

The computer-readable medium may include any tangible device capable of storing an instruction executed by an appropriate device, so that the computer-readable medium having the instruction stored thereon constitutes at least a part of a product including the instruction that may be executed in order to result in a means for executing an operation specified by a processing procedure or a block diagram. Examples of computer-readable media may include an electronic storage medium, a magnetic storage medium, an optical storage medium, an electromagnetic storage medium, a semiconductor storage medium, etc. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, etc.

The computer-readable instruction may include a source code or an object code described with any combination of one or more programming languages including an assembler instruction, an instruction set architecture (ISA) instruction, a machine instruction, a machine dependent instruction, a microcode, a firmware instruction, state setting data, or Smalltalk (registered trademark), JAVA (registered trademark), an object-oriented programming language such as C++ and a conventional procedural programming language such as "C" programming language or a similar programming language.

Computer-readable instructions may be provided to a general-purpose computer, a special-purpose computer, or a processor or a programmable circuit of other programmable data processing device, locally or via a local area network (LAN), a wide area network (WAN) such as the internet, and computer-readable instructions may be executed in order to result in a means for executing operations specified by the described processing procedure or the block diagram. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 vehicle
12 navigation device 14 information processing device
16 sensor
18 auxiliary machine
30 GUI element
40 character
80 occupant
100 display unit
102 GUI screen
200 processing unit
210 instruction accepting unit
220 obtaining unit
230 auxiliary machine control unit
240 display control unit
280 storage unit
292 microphone
294 camera
401 ON/OFF button
402 balloon setting button
403 set temperature up button
404 set temperature down button
405 air flow rate up button
406 air flow rate down button
410, 412, 414, 416 GUI screen
420 path
430 character
501 dial
502 slide button
510, 512, 514, 516 GUI screen
520 path
530 character
610 GUI screen
601, 602, 603, 604, 605, 606, 607, 608 button
610, 612, 614, 616 GUI screen
620 path
630 character
2000 computer
2010 host controller
2012 CPU
2014 RAM
2020 input/output controller
2022 communication interface
2024 flash memory
2026 ROM
2040 input/output chip

What is claimed is:

1. An information processing device comprising:
at least one processor configured to:
control a display which can display a graphical user interface (GUI) which accepts an operation instruction for an apparatus;
obtain an operation content of the apparatus intended by a user based on obtained information;
determine a presentation duration for which a presentation image of a character operating the GUI is displayed based on the obtained operation content, the presentation image comprises a first presentation image of the character moving toward a location of the GUI and a second presentation image of the character performing an operation of the GUI, wherein determining the presentation duration based on the obtained operation content comprises:
determining an arrival duration associated with the obtained operation content for the character to arrive at the location of the GUI and an operation duration associated with the obtained operation content for the character to perform the operation of the GUI;
cause the display to display the presentation image for the presentation duration by causing the display to display the first presentation image for the arrival duration and the second presentation image for the operation duration; and
while the second presentation image is being displayed, control, based on the obtained operation content, the apparatus to change an angle of a seat back or a height of a seat.

2. The information processing device according to claim 1, wherein the at least one processor is configured to determine the presentation duration based on a necessary duration required for the apparatus to complete an action associated with the obtained operation content.

3. The information processing device according to claim 2, wherein the at least one processor is configured to increase the presentation duration as the necessary duration increases.

4. The information processing device according to claim 1, wherein the at least one processor is further configured to cause the display to display an image of the character falling down as the presentation image if the presentation duration exceeds a predetermined duration.

5. The information processing device according to claim 1, wherein the at least one processor is further configured to cause the display to display an image of the character failing in the operation of the GUI as the presentation image if the presentation duration exceeds a predetermined duration.

6. The information processing device according to claim 1, wherein the at least one processor is further configured to increase the arrival duration as the presentation duration increases.

7. The information processing device according to claim 6, wherein the at least one processor is configured to increase the arrival duration by changing a path through which the character moves toward the location of the GUI if the presentation duration exceeds a predetermined duration.

8. The information processing device according to claim 1, wherein the at least one processor is further configured to accept an instruction from the user if the GUI is operated without the presentation image displayed, and wherein
the at least one processor is further configured to accept no instruction from the user if the GUI is operated with the presentation image displayed.

9. The information processing device according to claim 1, wherein the apparatus is an auxiliary machine of a vehicle.

10. The vehicle comprising the information processing device according to claim 9.

11. A non-transitory computer-readable storage medium which is configured to store a program which causes a computer to perform operations comprising:
control a display which can display a graphical user interface (GUI) which accepts an operation instruction for an apparatus;
an operation content of the apparatus intended by a user based on obtained information;
determine, based on the obtained operation content, a presentation duration for which a presentation image of a character operating the GUI is displayed, the presentation image comprises a first presentation image of the character moving toward a location of the GUI and a second presentation image of the character performing an operation of the GUI, wherein determining, based on the obtained operation content, the presentation duration comprises:
determining an arrival duration associated with the obtained operation content for the character to arrive at the location of the GUI and an operation duration associated with the obtained operation content for the character to perform the operation of the GUI;

cause the display to display the presentation image for the presentation duration by causing the display to display the first presentation image for the arrival duration and the second presentation image for the operation duration; and while the second presentation image is being displayed, control, based on the obtained operation content, the apparatus to change an angle of a seat back or a height of a seat.

12. An information processing method comprising, by at least one processor:

causing a display to display a graphical user interface (GUI) which accepts an operation instruction for an apparatus;

obtaining an operation content of the apparatus intended by a user based on obtained information;

determining a presentation duration for which a presentation image of a character operating the GUI is displayed based on the obtained operation content, the presentation image comprises a first presentation image of the character moving toward a location of the GUI and a second presentation image of the character performing an operation of the GUI, wherein determining the presentation duration based on the obtained operation content comprises:

determining an arrival duration associated with the obtained operation content for the character to arrive at the location of the GUI and an operation duration associated with the obtained operation content for the character to perform the operation of the GUI;

causing the display to display the presentation image for the presentation duration by causing the display to display the first presentation image for the arrival duration and the second presentation image for the operation duration; and while the second presentation image is being displayed, controlling, based on the obtained operation content, the apparatus to change an angle of a seat back or a height of a seat.

* * * * *